(12) United States Patent
Staudenmaier

(10) Patent No.: US 10,734,693 B2
(45) Date of Patent: Aug. 4, 2020

(54) CELL MODULE FOR ELECTRIC AND HYBRID VEHICLES

(71) Applicant: AUDI AG, Ingolstadt (DE)

(72) Inventor: Sascha Staudenmaier, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 65 days.

(21) Appl. No.: 15/981,982

(22) Filed: May 17, 2018

(65) Prior Publication Data

US 2018/0337435 A1      Nov. 22, 2018

(30) Foreign Application Priority Data

May 22, 2017   (DE) .......................... 10 2017 208641

(51) Int. Cl.
| | |
|---|---|
| *H01M 10/6557* | (2014.01) |
| *H01M 10/0525* | (2010.01) |
| *H01M 10/613* | (2014.01) |
| *H01M 10/6555* | (2014.01) |
| *H01M 2/10* | (2006.01) |
| *H01M 10/6554* | (2014.01) |
| *H01M 10/625* | (2014.01) |
| *H01M 10/6556* | (2014.01) |

(52) U.S. Cl.
CPC ..... *H01M 10/6557* (2015.04); *H01M 2/1077* (2013.01); *H01M 10/0525* (2013.01); *H01M 10/613* (2015.04); *H01M 10/625* (2015.04); *H01M 10/6554* (2015.04); *H01M 10/6555* (2015.04); *H01M 10/6556* (2015.04); *H01M 2220/20* (2013.01)

(58) Field of Classification Search
CPC ......... H01M 10/6557; H01M 10/6556; H01M 10/625; H01M 10/6554; H01M 10/0525; H01M 2/1077; H01M 10/6555; H01M 10/613; H01M 2220/20; H01M 2/024; H01M 2/0237
See application file for complete search history.

(56) References Cited

U.S. PATENT DOCUMENTS

| | | | | |
|---|---|---|---|---|
| 5,356,735 A | * | 10/1994 | Meadows ........... | H01M 2/0242 429/120 |
| 5,385,793 A | * | 1/1995 | Tiedemann ......... | H01M 10/625 429/120 |
| 2009/0111009 A1 | * | 4/2009 | Goesmann .............. | H01G 9/26 429/120 |

(Continued)

FOREIGN PATENT DOCUMENTS

| | | |
|---|---|---|
| DE | 102008027293 A1 | 12/2009 |
| DE | 102010013025 A1 | 9/2011 |

(Continued)

OTHER PUBLICATIONS

Extended European Search Report dated Oct. 15, 2018, in connection with corresponding EP Application No. 18168674.2 (13 pgs., including machine-generated English translation).

(Continued)

*Primary Examiner* — Lisa S Park
(74) *Attorney, Agent, or Firm* — Maier & Maier, PLLC

(57) ABSTRACT

A cell module for electric and hybrid vehicles, in which channels for a heat exchange are integrated into at least one outer wall of the module.

5 Claims, 4 Drawing Sheets

(56) References Cited

U.S. PATENT DOCUMENTS

| | | | | |
|---|---|---|---|---|
| 2011/0304297 A1* | 12/2011 | Sohn | ................ | H01M 10/46 |
| | | | | 320/107 |
| 2014/0011059 A1* | 1/2014 | Hashimoto | ......... | H01M 2/1077 |
| | | | | 429/72 |
| 2014/0234687 A1* | 8/2014 | Fuhr | .................. | H01M 2/1077 |
| | | | | 429/120 |

FOREIGN PATENT DOCUMENTS

| | | |
|---|---|---|
| DE | 102013107668 A1 | 1/2014 |
| DE | 102016008110 A1 | 2/2017 |
| DE | 10 2015 222 138 A1 | 5/2017 |
| DE | 102016125859 A1 | 7/2017 |

OTHER PUBLICATIONS

Examination Report dated Jan. 15, 2018 of corresponding German Application No. 102017208641.6; 10 pgs.

\* cited by examiner

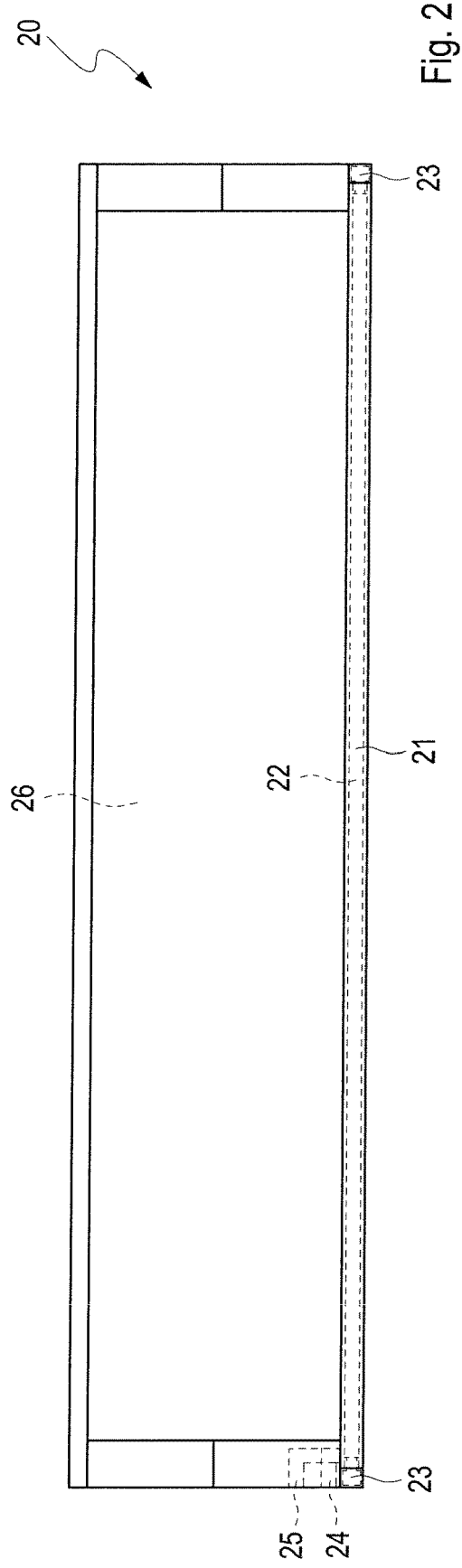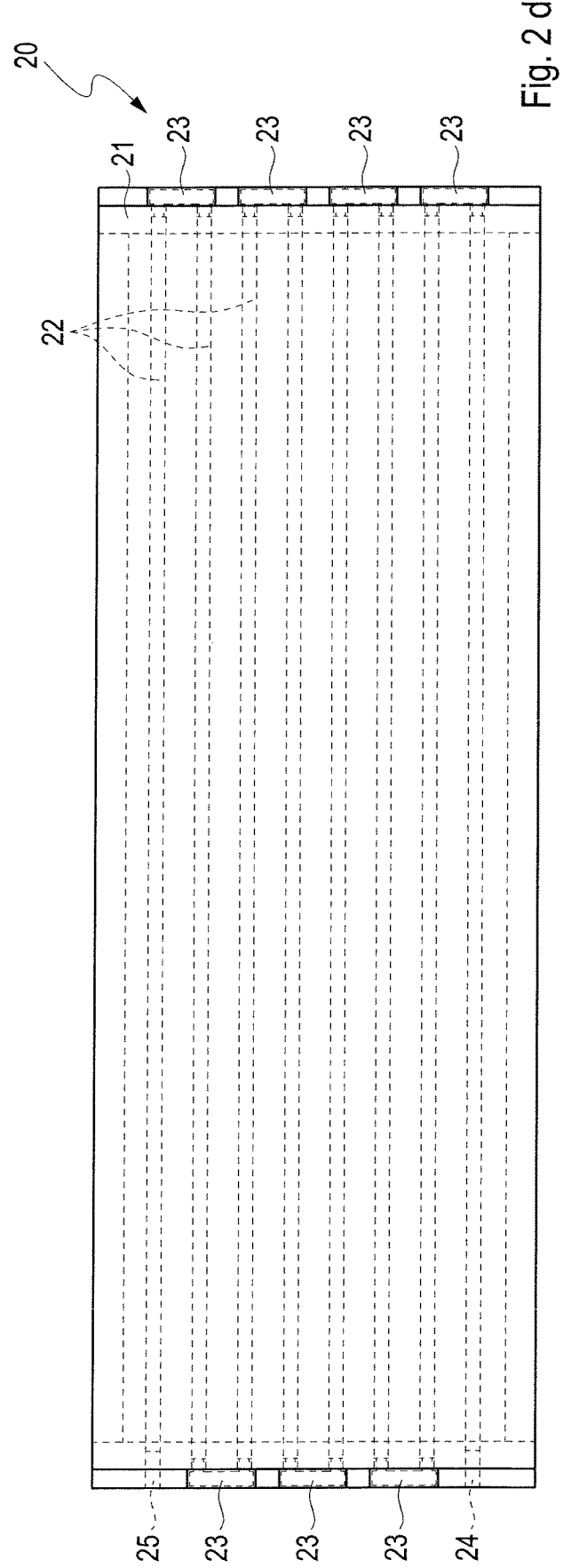

CELL MODULE FOR ELECTRIC AND HYBRID VEHICLES

FIELD

The present invention relates to a cell module for electric and hybrid vehicles, for which, in at least one outer wall of the module, channels for a heat exchange are integrated.

BACKGROUND

High-voltage batteries for vehicle applications contain individual cells that are connected in series and/or in parallel. In the operating state, the individual cells, such as, for example, lithium ion cells, are heated to an operating temperature or else cooled in order to dissipate ensuing heat loss. For this purpose, means suitable for heat exchange are required in the battery. The individual cells are usually combined into cell modules, of which the battery comprises a large number.

In the case of liquid cooling, which is preferably used for reasons of packing space, a thermally conductive plate, through which circulates a cooling fluid, is arranged at a component assembly comprising a plurality of cell modules, and the cell modules are in thermally conductive connection with it. The cell modules are therefore cooled indirectly by way of a housing. Different forms of construction of the thermally conductive plate have been proposed.

DE 10 2016 008 110 A1 discloses a bottom plate for a battery, in particular a traction battery, which serves as a thermally conductive plate for the battery. The bottom plate is produced from extrusion-molded profiles and fixed with pipes, through which circulates cooling water, and are arranged in a meandering pattern.

Known from DE 10 2010 013 025 A1 are a battery and a method for producing a battery with a cooling plate that is arranged in a battery housing. The battery housing is cooled by the cooling plate, in which cooling channels, which are produced in an extrusion molding method, are arranged in a meandering form.

DE 10 2013 107 668 A1 discloses a battery with a cell carrier or module carrier having at least one cooling channel, with which battery cells or battery modules are thermally connected. In the production of the cell carrier or module carrier, the cooling channel is cast in it during the same casting operation as for the cell carrier or module carrier.

The use of thermally conductive plates of this kind entails a number of drawbacks. The cooling system is inefficient, because it is necessary to cool all the way through a plurality of layers (e.g., CDP coating, adhesive, gap filler) and a large part of the cooling performance is lost at the housing. The construction makes the battery complex, expensive, and heavy. Tolerances need to be taken into consideration due to welding distortions and a number of tolerance additions. As a result of this, there is high cost for planning, simulation, and design. Much area and high investments are required for fabrication of the battery. The search for leakages in the cooling circuit necessitates tedious and expensive checks. When a part of the cooling is not leaktight or is damaged, a high cost for reworking or for service or customer service thereby results. The battery must then be taken apart completely or, if need be, completely replaced. Any leakage of the cooling entails the replacement of the entire housing.

SUMMARY

The invention is therefore based on the object of making available an improved battery, which avoids the described drawbacks. Beyond this, the object of the invention is to present a simple method for producing such a battery.

A subject of the present invention is a cell module for a battery, in particular a traction battery for a motor vehicle, for which, in at least one outer wall of the module, pipe-shaped cavities ("coolant channels") for a heat exchange are integrated.

The cell module according to the invention contains at least one rechargeable battery cell (rechargeable secondary cell). In one embodiment, the cell module contains a plurality of rechargeable battery cells that are electrically connected in parallel and/or in series. Examples of suitable rechargeable battery cells comprise lithium ion cells, lithium polymer cells, lithium iron phosphate cells, sodium-sulfur cells, and sodium-nickel chloride cells. In one embodiment, lithium ion cells are used.

The rechargeable battery cells or individual cells are arranged in the interior of the cell module and are enclosed by the outer walls thereof, which, together with a bottom plate, a cover plate, and four side plates, form a cell module housing. At least one outer wall of the cell module has pipe-shaped cavities, which extend over the entire length or the entire width of the outer wall. Said pipe-shaped cavities ("coolant channels") are equipped for the circulation of a heat exchange medium ("coolant"). In one embodiment of the cell module, the bottom plate of the cell module has pipe-shaped cavities. In another embodiment of the cell module, the side plate of the cell module has pipe-shaped cavities. In another embodiment, a plurality of the outer walls of the cell module have hollow-formed cavities—for example, the bottom plate and the cover plate or two opposite-lying side plates or else both a bottom plate and/or a cover plate and two opposite-lying side plates.

In one embodiment of the cell module, the pipe-shaped cavities are arranged parallel to one another. In one embodiment, the separation of adjacent pipe-shaped cavities is chosen in such a way that the heat flow between the cavities via the outer wall is negligible in comparison to the heat transport by the heat exchange medium. The cavities do not lie directly "wall to wall" with respect to one another in order to ensure a heat dissipation that is as efficient as possible, because, otherwise, a heat exchange between forward flow and return flow would take place. In one embodiment, the separation of adjacent pipe-shaped cavities corresponds to at least one inner diameter of the cavity. In another embodiment, the separation corresponds to a multiple of an inner diameter of the cavity. However, the separation of adjacent pipe-shaped cavities can also be smaller than an inner diameter of the cavity.

An outer wall with pipe-shaped cavities in parallel arrangement can be produced advantageously by extrusion molding. In one embodiment of the cell module, at least one outer wall of the cell module comprises a profile produced by extrusion molding. In another embodiment, two outer walls of the cell module each comprise a profile produced by extrusion molding. In another embodiment, four outer walls of the cell module each comprise a profile produced by extrusion molding. In another embodiment, all outer walls of the cell module each comprise a profile produced by extrusion molding. In another embodiment, the cell module comprises a profile with a rectangular cross section, which forms the bottom plate, the cover plate, and two opposite-lying side plates of the cell module. The rechargeable battery cells are arranged in the cavity enclosed by the profile.

In one embodiment, the profile is composed essentially of aluminum or an aluminum alloy.

The pipe-shaped cavities in the outer wall of the cell module according to the invention are provided and equipped for the purpose of circulating a heat exchange medium in the operating state in order to cool or to heat the rechargeable battery cells situated in the cell module. In one embodiment, the heat exchange medium is a gas, such as, for example, air. In another embodiment, the heat exchange medium is a liquid, such as, for example, water, cooling fluid, or oil.

In one embodiment of the cell module, the openings of two pipe-shaped cavities that are adjacent to each other are connected by a hollow connecting element. By way of the connecting element, a fluidic connection of the cavities is created, so that the two connected cavities form a continuous flow path for the heat exchange medium.

In one embodiment, the connecting element is designed as a U-shaped bridging element. In another embodiment, the connecting element has sealing lips, which seal the openings of the cavities, so that, between the connecting element and the mutually connected openings of the cavities, no heat exchange medium can leak out. In one embodiment, hollow U-shaped bridging elements are used, which have redundant sealing lips in order to connect the coolant channels to one another and to seal the bridging elements with respect to the cooling channels.

In other embodiments, the connecting element can also be bonded adhesively in the openings of the cavities or else pressed into them in a force-fitting manner in order to achieve a sealing.

In one embodiment, an opening of each of the two pipe-shaped cavities of an outer wall that have greatest separation from each other are connected to a heat exchange medium circuit and the remaining openings of the pipe-shaped cavities that are contained in the outer wall are each connected to one another in pairs by way of a connecting element in such a way that, through the cavities, a meandering flow path of the heat exchange medium is formed. Through the meandering circulation of the cavities in the outer wall of the cell module, an effective heat transport is achieved. This is appropriate, in particular, for connections arranged on one side. In the case of connections that are arranged on alternate sides, it is possible to provide both a meandering flow path and also a plurality of flow paths arranged in parallel, through which the heat exchange medium flows only in one direction.

In one embodiment, the connection to the heat exchange medium circuit—for example, the cooling system of a motor vehicle—is made through hoses, which are fastened by means of clamps to connecting pieces, which are each connected to an opening of the two pipe-shaped cavities of an outer wall that have the greatest separation from each other (forward and return flow of the module). In another embodiment, the connection of the cell module to the heat exchange medium circuit is produced by means of quick-lock couplers or other connecting elements.

This offers the additional advantage that the cell modules can all be connected in parallel with the forward flow and return flow, as a result of which the maximum possible temperature spread between the cell modules can be kept extremely small.

In the operating state, each cell module is circulated directly with a heat exchange medium. This results in a number of advantages in comparison to the batteries of prior art. The efficiency of additional layers that diminish the heat transfer, such as, for example, CDP coatings, thermally conductive adhesive, or gap filler, is dispensed with. No loss of cooling performance at the housing takes place any longer. The principle of construction is simple, and the cell module can be produced in a cost-effective manner and is very light. No tolerances due to welding distortions and tolerance additions ensue any longer. For the fabrication, neither large areas nor high investments are required. The cost for reworking or service or customer service is small when a part of the cooling is not leaktight or is damaged. The modules can be checked simply and replaced rapidly; any sites that are not leaktight are quickly found.

The elements for the heat exchange are integrated directly in the cell module housing. As a result, a separate cooling plate and cooling pipes with circulation, which are usually contained in a battery housing, are dispensed with in order to ensure the cooling with an active cooling medium. In this way, the production process is simplified, production costs are lowered, and, in addition, the efficiency of the cooling is also increased.

The cavities in the cell module according to the invention serve additionally also as an integrated "crash structure." In the case of a battery that is installed in a motor vehicle and is constructed from the cell modules according to the invention, impacts from below, due, for example, to so-called "bollard toppling" or "bottoming out", are absorbed, with the heat exchange medium (or the cooling fluid) acting as a damper.

Minor deformations (dents) caused by such impacts at the underside of the cell module do not influence the effect of the heat exchange, since a circulation of the heat exchange medium continues to occur, because the coolant channels can undergo plastic deformation in the lateral direction and a denting of a pipe-shaped cavity does not cause any problems as long as the entire cross section of the cavity is not blocked. This increases the operating safety of the motor vehicle and prevents breakdowns due to damage to the battery or, in the event of damage, reduces the costs for the owner of the vehicle or the insurance thereof.

The subject of the invention is also a battery, in particular for a motor vehicle, which contains at least one cell module according to the invention. In one embodiment, the battery contains a plurality of cell modules according to the invention that are in electric and fluidic connection with one another.

The subject of the invention is also a method for producing a cell module according to the invention. The method comprises the provision of at least one extrusion-molded profile, which has pipe-shaped cavities in parallel arrangement. The extrusion-molded profile is or the extrusion-molded profiles are used as at least one outer wall for the cell module according to the invention and form(s), together with the remaining outer walls, a housing for the rechargeable battery cells arranged in the cell module or in the interior of the housing. In one embodiment of the method, openings of adjacent pipe-shaped cavities are connected to connecting elements, which produce a fluidic connection of the adjacent pipe-shaped cavities. In another embodiment, the pipe-shaped cavities contained in the extrusion-molded profile are connected to one another through connecting elements in such a way that a contiguous flow path results, which extends in a meandering path through the extrusion-molded profile. In another embodiment with opposite-lying connections for the forward flow and return flow of the heat exchange medium, a plurality of parallel flow paths pass in one direction through the extrusion-molded profile.

BRIEF DESCRIPTION OF THE DRAWINGS

The invention will be illustrated schematically in the drawings on the basis of embodiments and will be described further with reference to the drawings. Shown are.

DETAILED DESCRIPTION OF THE DRAWINGS

Figure 1:
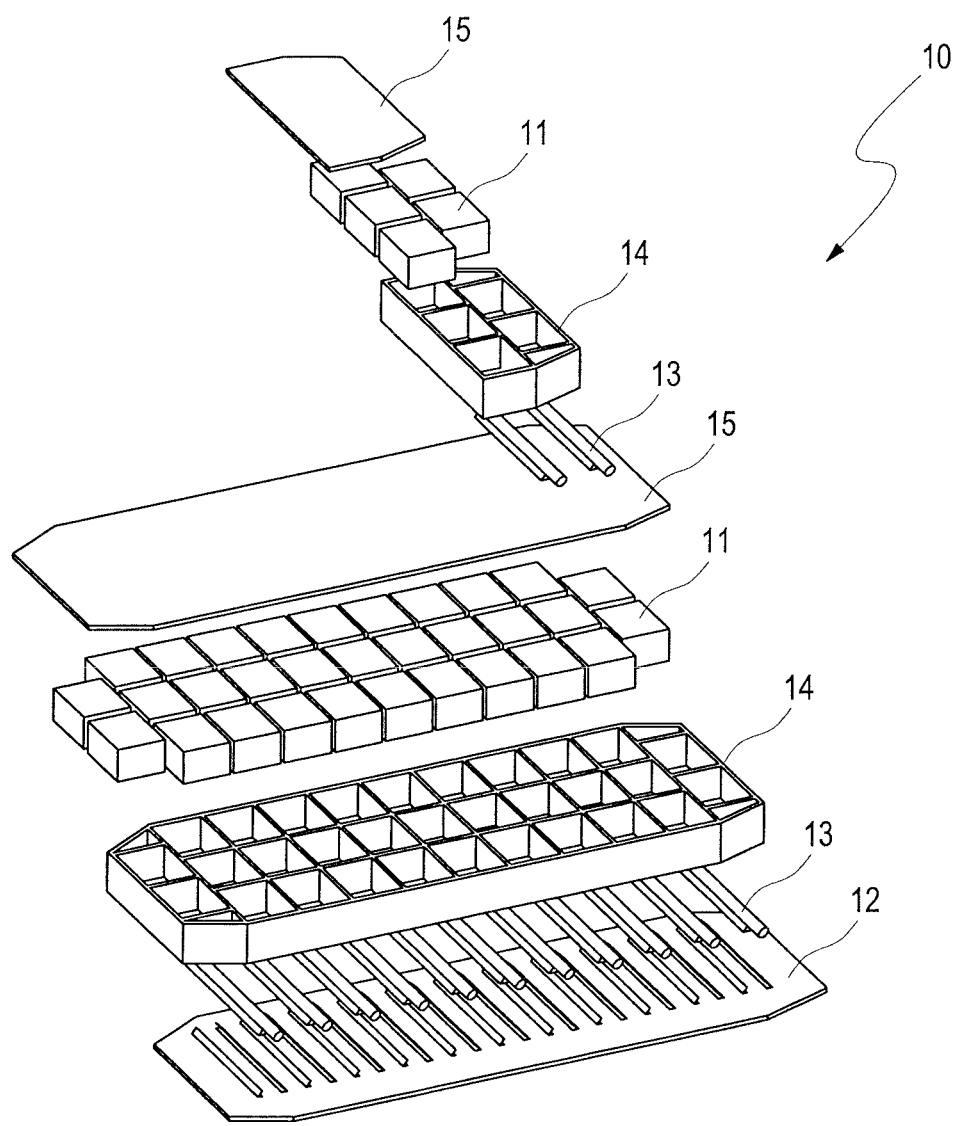
FIG. 1 is a perspective exploded illustration, a vehicle battery.

FIG. 1 shows, in a perspective exploded illustration, a vehicle battery 10. The battery 10 contains a number of cell modules 11, which are each mounted on two levels lying one on top of the other in a housing 14. Each housing 14 is closed and sealed with a cover 15. The cell modules 11 in the two housings 14 are each cooled via a cooling pipe 13 arranged beneath the bottom of the housing 14. Forming the completion of the battery 10 on the bottom is an underride guard 12, which is intended to protect the battery 10 against damage due to impacts from below and fixes in place the cooling pipes 13.

Figure 2:
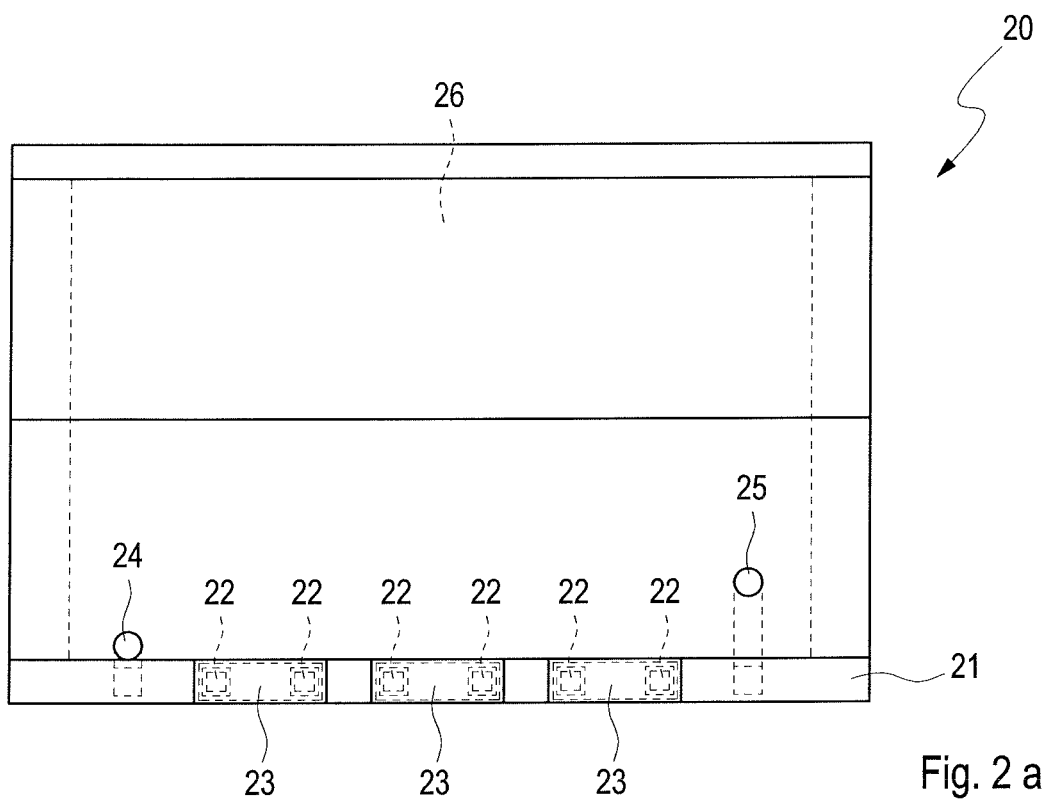
FIG. 2a is a schematic illustration of a front view of embodiment of the cell module according to the invention.
FIG. 2b is a schematic illustration of a rear view of embodiment of the cell module according to the invention.
FIG. 2c is a schematic illustration of a side view of embodiment of the cell module according to the invention.
FIG. 2d is a schematic illustration of a view from below of embodiment of the cell module according to the invention.
Figure 2:
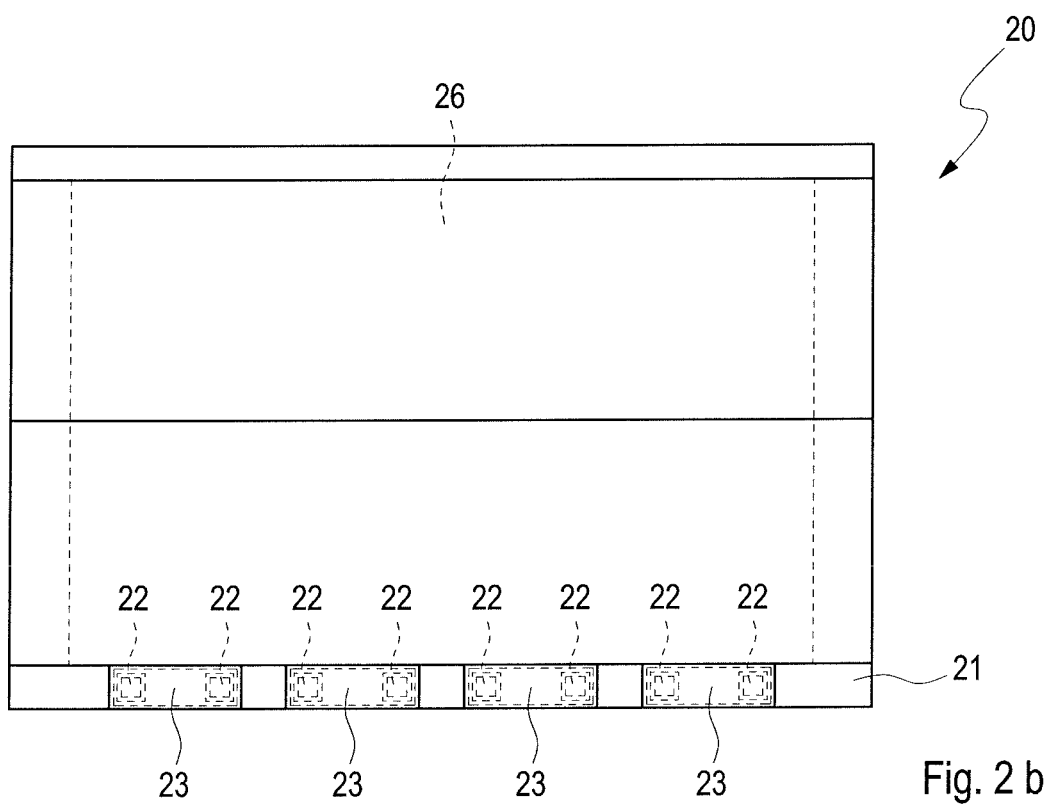

FIGS. 2a-2d show, in a schematic illustration, different views of one embodiment of the cell module according to the invention 20. FIG. 2a shows a view of the cell module 20 from the front; FIG. 2b shows a view from the rear; FIG. 2c shows a view from the side; and FIG. 2d shows a view from below.

In the embodiment shown, an outer wall of the cell module 20, namely, the bottom plate 21, has a number of pipe-shaped cavities or coolant channels 22, which run parallel to one another and extend from an edge or end face of the bottom plate 21 to the opposite-lying edge or end face. At the two coolant channels 22 that are most distant from each other, there is a feed line 24 for the forward flow of the coolant or a discharge line 25 for the return flow of the coolant. In the operating state, the lines 24 and 25 are connected to a coolant circuit, such as, for example, the cooling system of a motor vehicle and/or are connected in parallel or in series to other cell modules. As can be seen from FIG. 2d, in particular, the openings of adjacent coolant channels 22 are each connected by hollow connecting elements 23. In this way, the coolant channels 22 and the connecting elements 23 together form a meandering flow path through the bottom plate 21, which extends from the coolant inlet 24 to the coolant outlet 25. In the operating state, a heat exchange medium, such as, for example, a cooling fluid, flows through said flow path. Via the bottom plate 21, heat is exchanged between the heat exchange medium and rechargeable battery cells (not illustrated in the drawing) arranged in the interior 26 of the cell module 20.

Figure 3:
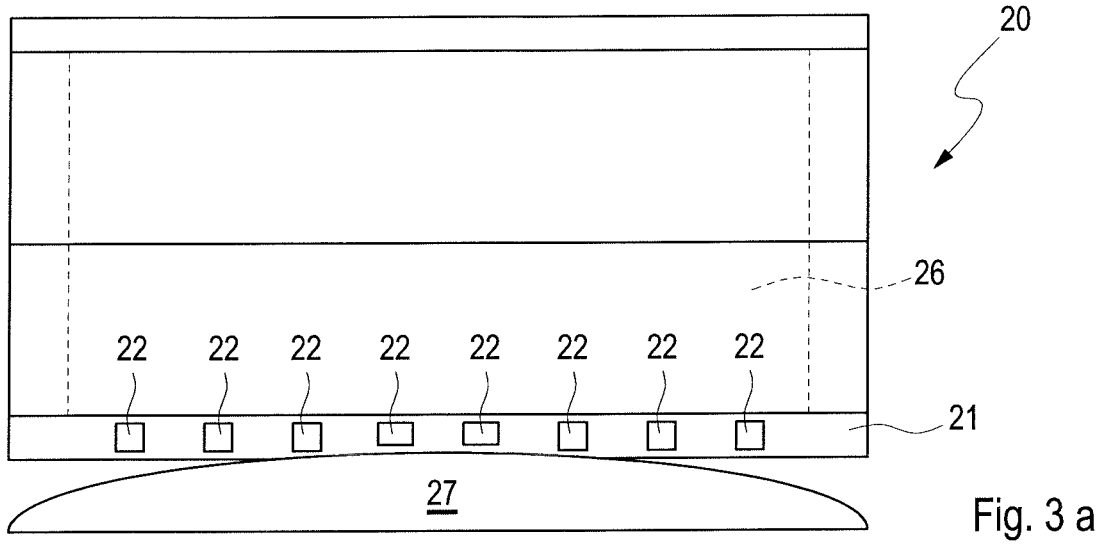
FIG. 3a is a schematic illustration of phase a) of an impact of one embodiment of the cell module according to the invention against an obstacle.
FIG. 3b is a schematic illustration of phase b) of an impact of one embodiment of the cell module according to the invention against an obstacle.
FIG. 3c is a schematic illustration of phase c) of an impact of one embodiment of the cell module according to the invention against an obstacle.
Figure 3:
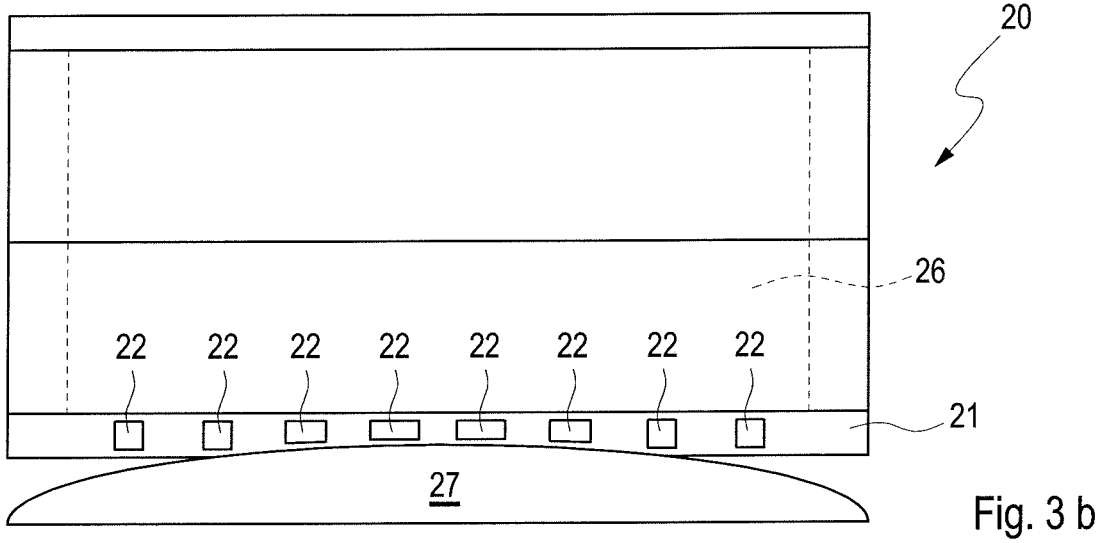
Figure 3:
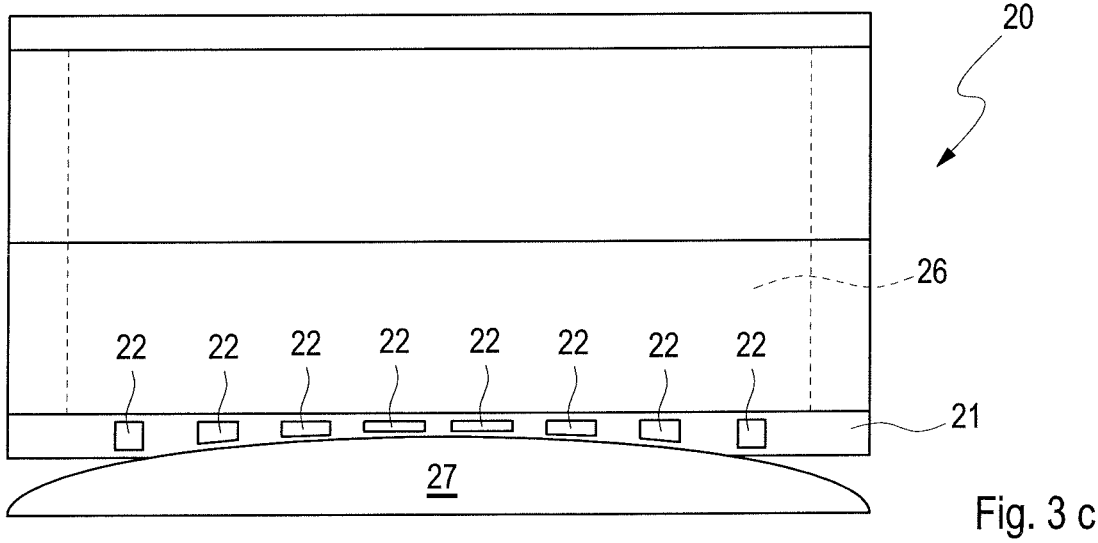

FIGS. 3a-3c show, in a schematic illustration, different phases a) to c) of an impact of one embodiment of the cell module according to the invention 20 against an obstacle 27. The cell module 20 is illustrated in a rear view. As illustrated in FIGS. 3a to 3c, which show the successive phases of the impact against the obstacle 27, the cavities 22 in the cell module 20 serve as an integrated "crash structure" during an impact against an obstacle 27 or during an impact from below against the bottom plate 21, with the heat exchange medium (or the cooling fluid) in the cavities or coolant channels 22 acting as a damper. The cavities 22 absorb the impact energy and undergo plastic deformation. Their cross section is thereby reduced in the direction of the impact and expanded perpendicular to the direction of impact in the bottom plate 21 toward both sides.

The invention claimed is:

1. A cell module for a battery comprising:
at least one outer wall of the cell module; wherein the at least one outer wall forms a plurality of internal, pipe-shaped cavities furnished for the purpose of circulating a heat exchange medium;
wherein the plurality of internal, pipe-shaped cavities are wholly formed by and bounded by the at least one outer wall and the heat exchange medium directly contacts a wall of the plurality of internal, pipe-shaped cavities;
wherein the plurality of internal, pipe-shaped cavities extend over an entire length or an entire width of the outer wall and are provided with openings at their ends;
wherein the openings of two adjacent-lying pipe-shaped cavities are connected by a hollow connecting element; wherein the connecting element is designed as a U-shaped bridging element.

2. The cell module according to claim 1, wherein the pipe-shaped cavities are arranged parallel to one another.

3. The cell module according to claim 1, in which the connecting element has sealing lips, which seal the openings of the cavities, so that, between the connecting element and the openings of the cavities, no heat exchange medium can leak out.

4. The cell module according to claim 1, wherein the openings of the pipe-shaped cavities that have the greatest separation from one another are connected to a heat exchange medium circuit and the remaining openings of the pipe-shaped cavities contained in the outer wall are each connected to one another in pairs by way of a connecting element in such a way that a flow path of the heat exchange medium is formed through the cavities.

5. A battery which contains at least one cell module according to claim 1.

* * * * *